(12) United States Patent
Takahashi et al.

(10) Patent No.: US 9,383,625 B2
(45) Date of Patent: Jul. 5, 2016

(54) BLADE-DRIVING DEVICE, OPTICAL DEVICE, AND METHOD FOR PRODUCING ARM

(71) Applicant: SEIKO PRECISION INC., Narashino-shi (JP)

(72) Inventors: Hiroshi Takahashi, Narashino (JP); Mitsuru Suzuki, Narashino (JP); Makoto Toriumi, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/700,662

(22) Filed: Apr. 30, 2015

(65) Prior Publication Data

US 2015/0234257 A1    Aug. 20, 2015

Related U.S. Application Data

(63) Continuation of application No. PCT/EP2013/078870, filed on Oct. 24, 2013.

(30) Foreign Application Priority Data

Nov. 1, 2012    (JP) ................................. 2012-241983

(51) Int. Cl.
| | | |
|---|---|---|
| G03B 9/08 | (2006.01) | |
| G03B 9/42 | (2006.01) | |
| B29C 65/16 | (2006.01) | |
| B32B 37/18 | (2006.01) | |
| B32B 37/14 | (2006.01) | |
| B32B 37/06 | (2006.01) | |
| B32B 38/00 | (2006.01) | |
| B29L 31/00 | (2006.01) | |

(52) U.S. Cl.
CPC . *G03B 9/42* (2013.01); *B29C 65/16* (2013.01); *B32B 37/06* (2013.01); *B32B 37/142* (2013.01); *B32B 37/18* (2013.01); *B32B 38/0008* (2013.01); *B29L 2031/764* (2013.01); *B32B 2559/00* (2013.01)

(58) Field of Classification Search
CPC .................................... G03B 9/42; G03B 9/40
USPC .................................................. 396/489, 456
See application file for complete search history.

(56) References Cited

U.S. PATENT DOCUMENTS

2008/0240707 A1    10/2008    Yasuda

FOREIGN PATENT DOCUMENTS

| JP | H07-168248 | 7/1995 |
|---|---|---|
| JP | 2001-21942 | 1/2001 |
| JP | 2008-242351 A1 | 10/2008 |

OTHER PUBLICATIONS

International Search Report for International Application No. PCT/JP2013/078870 dated Feb. 4, 2014.
Office Action issued on Apr. 26, 2016 in the counterpart Japanese patent application No. 2012-241983, with translation.

*Primary Examiner* — Clayton E LaBalle
*Assistant Examiner* — Dennis Hancock
(74) *Attorney, Agent, or Firm* — Kratz, Quintos & Hanson, LLP (57) ABSTRACT

A blade-driving device includes: a board including an opening; a blade opening and closing the opening; an arm driving the blade and made of a synthetic resin; a drive member driving the arm; and a reinforcement member formed with a laser welding mark indicating a mark formed by laser welding the reinforcement member and the arm together, and made of a synthetic resin.

11 Claims, 6 Drawing Sheets

BLADE-DRIVING DEVICE, OPTICAL DEVICE, AND METHOD FOR PRODUCING ARM

CROSS-REFERENCE TO RELATED APPLICATION

This application is a continuation of and claims priority to International Patent Application No. PCT/JP2013/078870 filed on Oct. 24, 2013, which claims priority to Japanese Patent Application No. 2012-241983 filed on Nov. 1, 2012, subject matter of these patent documents is incorporated by reference herein in its entirety.

BACKGROUND (i) Technical Field

The present invention relates to blade-driving devices, optical devices and methods for producing arms.

(ii) Related Art

There is known a device in which a blade opens and closes an opening of a board. Such a device includes an arm for driving the blade and a drive member for driving the arm. Japanese Unexamined Patent Application Publication No. 07-168248 discloses an arm attached with a reinforcement member.

Depending on a thickness or a material of the reinforcement member, the reinforcement member might be partially peeled off from the arm.

SUMMARY

According to an aspect of the present invention, there is provided a blade-driving device includes: a board including an opening; a blade opening and closing the opening; an arm driving the blade and made of a synthetic resin; a drive member driving the arm; and a reinforcement member formed with a laser welding mark indicating a mark formed by laser welding the reinforcement member and the arm together, and made of a synthetic resin.

DETAILED DESCRIPTION

Figure 1:
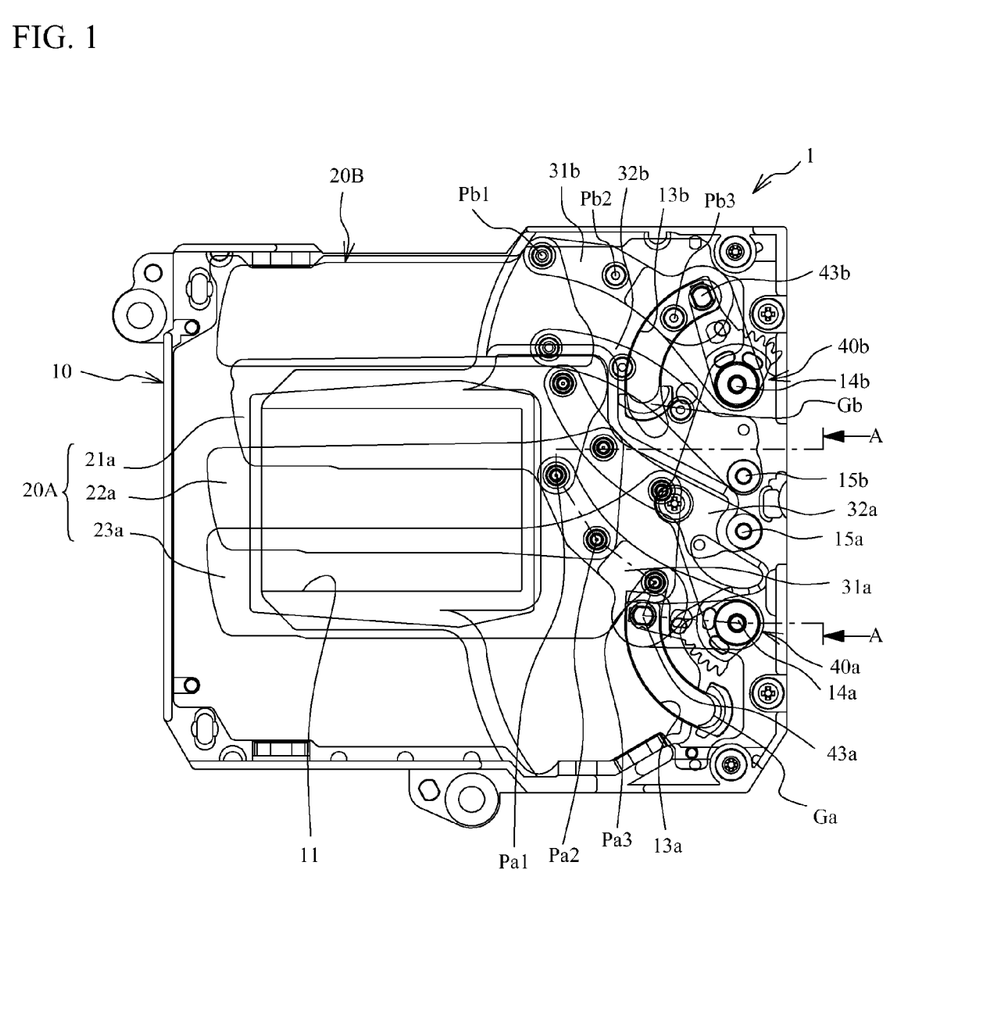
FIG. 1 is a front view of inner structure of a focal-plane shutter according to the present embodiment.
Figure 2:
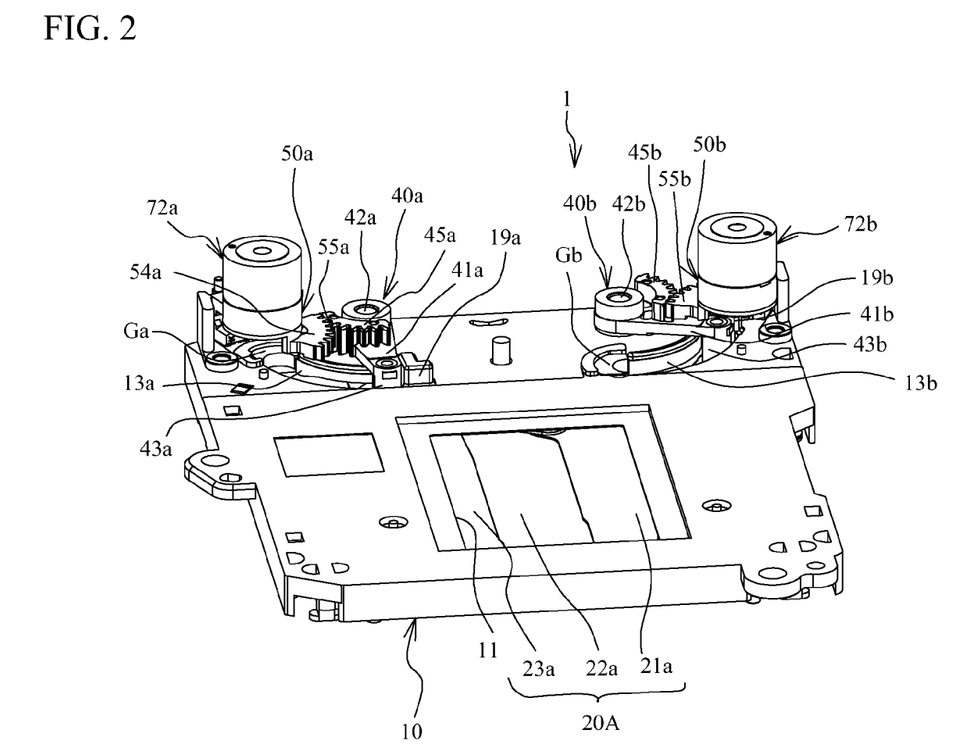
FIG. 2 is an external perspective view of the focal-plane shutter.

In the present embodiment, a focal-plane shutter 1 will be described as an example of a blade-driving device. FIG. 1 is a front view of inner structure of the focal-plane shutter 1 according to the present embodiment. FIG. 2 is an external perspective view of the focal-plane shutter 1. The focal-plane shutter 1 is employed in an optical instrument such as a digital camera or a still camera. The focal-plane shutter 1 includes a board 10, a leading blade 20A, a trailing blade 20B, arms 31a, 32a, 31b, and 32b, drive members 40a and 40b, output members 50a and 50b, and rotors 72a and 72b. Additionally, the rotors 72a and 72b, and the output members 50a and 50b are omitted in FIG. 1. The board 10 includes an opening 11. The leading blade 20A and the trailing blade 20B open and close the opening 11. The rotor 72a is included in an actuator for driving the leading blade 20A. The rotor 72b is included in an actuator for driving the trailing blade 20B. Each actuator includes a stator around which a coil is wound, and is omitted in FIGS. 1 and 2.

The leading blade 20A includes plural blades 21a to 23a. The trailing blade 20B also includes plural blades. Each of the leading blade 20A and the trailing blade 20B can shift between an overlapped state where the plural blades overlap one another and an expanded state where the plural blades are expanded. These plural blades recede from the opening 11 in the overlapped state to bring the opening 11 into a fully opened state. These plural blades close the opening 11 in the expanded state to bring the opening 11 into a fully closed state. FIGS. 1 and 2 illustrate the state where the expanded leading blade 20A closes the opening 11 and the trailing blade 20B recedes from the opening 11.

The leading blade 20A is connected to the arms 31a and 32a. The trailing blade 20B is connected to the arms 31b and 32b. As illustrated in FIG. 1, the arms 31a, 32a, 31b, and 32b are rotatably supported by spindles 14a, 15a, 14b, and 15b provided in the board 10, respectively.

The drive members 40a and 40b drive the arms 31a and 31b, respectively. The drive members 40a and 40b are provided with drive pins 43a and 43b connected to the arms 31a and 31b, respectively. The board 10 is formed with escape slots 13a and 13b for permitting the movement of the drive pins 43a and 43b, respectively. The drive members 40a and 40b will be described later in detail. The rotors 72a and 72b are respectively connected to the output members 50a and 50b. The rotation of the rotors 72a and 72b rotates the output members 50a and 50b, so the drive members 40a and 40b rotates, which drives the leading blade 20A and the trailing blade 20B, respectively. The positions of rotational axes of the output members 50a and 50b and the drive members 40a and 40b are different from one another. Additionally, the output members 50a and 50b and the drive members 40a and 40b are respectively formed with gear portions 55a, 55b, 45a, and 45b. The gear portions 55a and 45a mesh with each other, and the gear portions 55b and 45b mesh with each other, so that the rotation of the output members 50a and 50b respectively rotate the drive members 40a and 40b.

As illustrated FIG. 2, the board 10 is formed with a positioning portion 19a near one end of the escape slot 13a. Likewise, a positioning portion 19b is formed near one end of the escape slot 13b. The other ends of the escape slots 13a and 13b are provided with rubbers Ga and Gb for absorbing the impact of the drive members 40a and 40b, respectively. In addition, the board 10 is assembled with a holder holding the above actuators not illustrated.

As illustrated in FIG. 1, connection pins Pa1 to Pa3 connect the arm 31a with the leading blade 20A. Connection pins Pb1 to Pb3 connect the arm 31b with the trailing blade 20B. Also, the arm 32a is connected with the leading blade 20A by connection pins without reference numerals. Likewise, the arm 32b is connected with the trailing blade 20B by connection pins. The connection pins Pa1 to Pa3 and Pb1 to Pb3 have the same shape and the same size.

Figure 3:
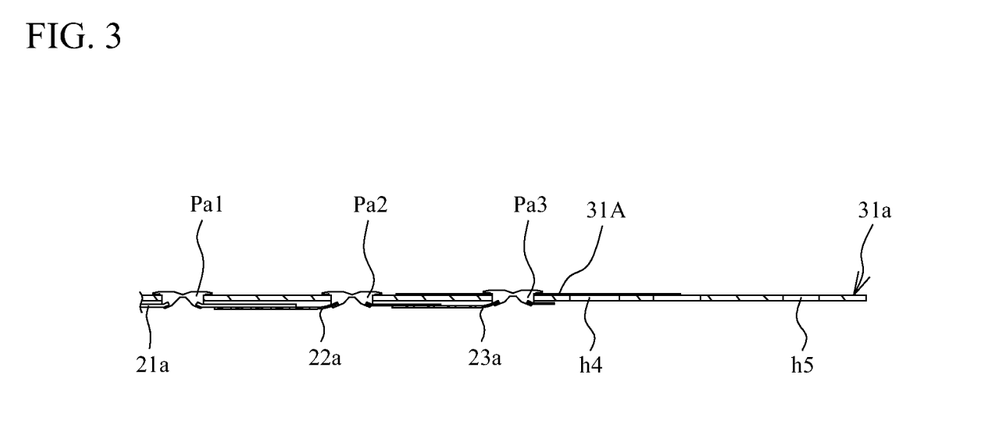
FIG. 3 is a sectional view taken along line A-A of FIG. 1.

FIG. 3 is a sectional view taken along line A-A of FIG. 1. In addition, in FIG. 3, the arm 31a, the connection pins Pa1 to Pa3, and the blades 21a to 23a are illustrated, but the board 10 and the like are omitted. The connection pins Pa1 to Pa3 connect the respective blades 21a to 23a with the arm 31a. The arm 31a is bonded with a reinforcement member 31A. This will be described later in detail.

Figure 4:
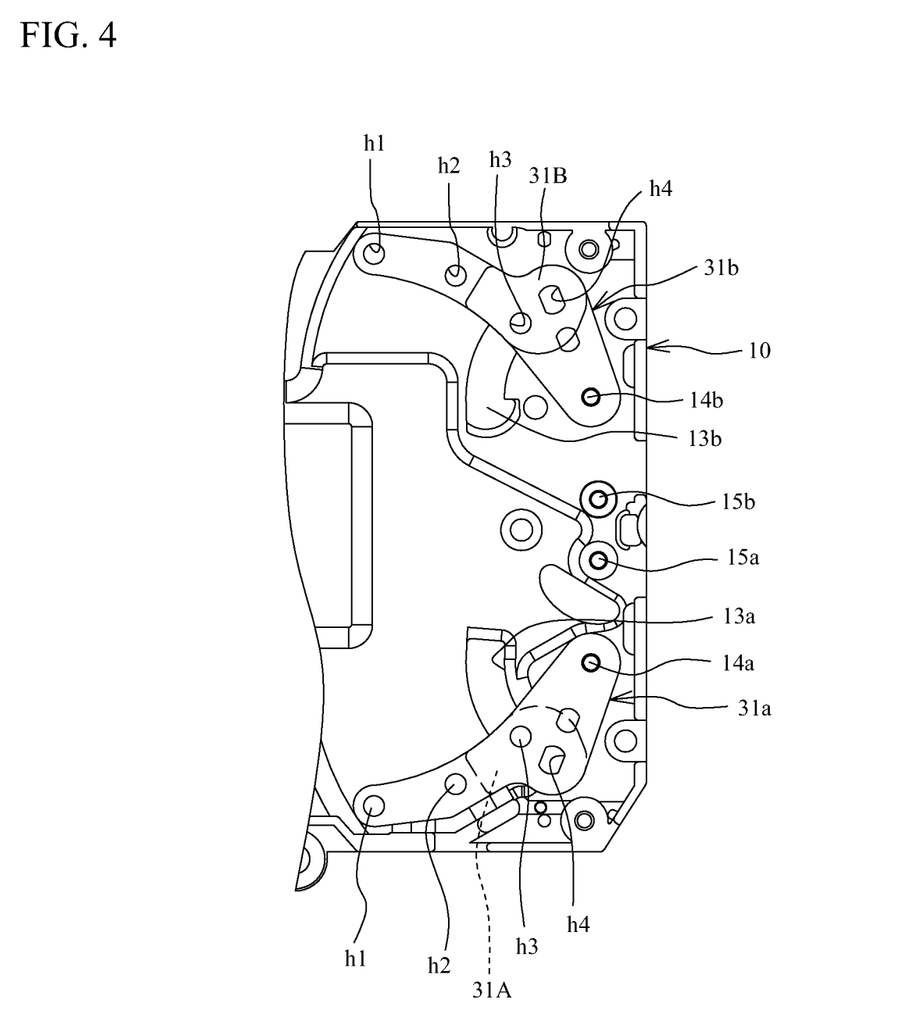
FIG. 4 is an enlarged view of a board and arms.

Next, the arms 31a and 31b will be described. FIG. 4 is an enlarged view of the board 10, and the arms 31a and 31b. In addition, FIG. 4 illustrates the arm 31a in a state where the leading blade 20A recedes from the opening 11. The arm 31a is formed with: through holes h1 to h3 through which the connection pins Pa1 to Pa3 respectively penetrate; and an insertion hole h4 into which the drive pin 43a of the drive member 40a is inserted. The arm 31a is partially bonded with the reinforcement member 31A. Also, the arm 31b is partially bonded with a reinforcement member 31B. This ensures the rigidity of the arms 31a and 31b, thereby preventing from being bent and damaged. Herein, the arms 31a and 31b have the same shape, the same size, and the same material. Likewise, the reinforcement members 31A and 31B have the same shape, the same size, and the same material. The arms 31a and 31b each has a thin plate shape, and the reinforcement members 31A and 31B each has a thin plate shape. The arm 31a and the reinforcement member 31A are made of synthetic resins. In FIG. 4, the reinforcement member 31A is bonded on a rear side of the arm 31a, and the reinforcement member 31B is bonded on a front side of the arm 31b.

Figure 5:
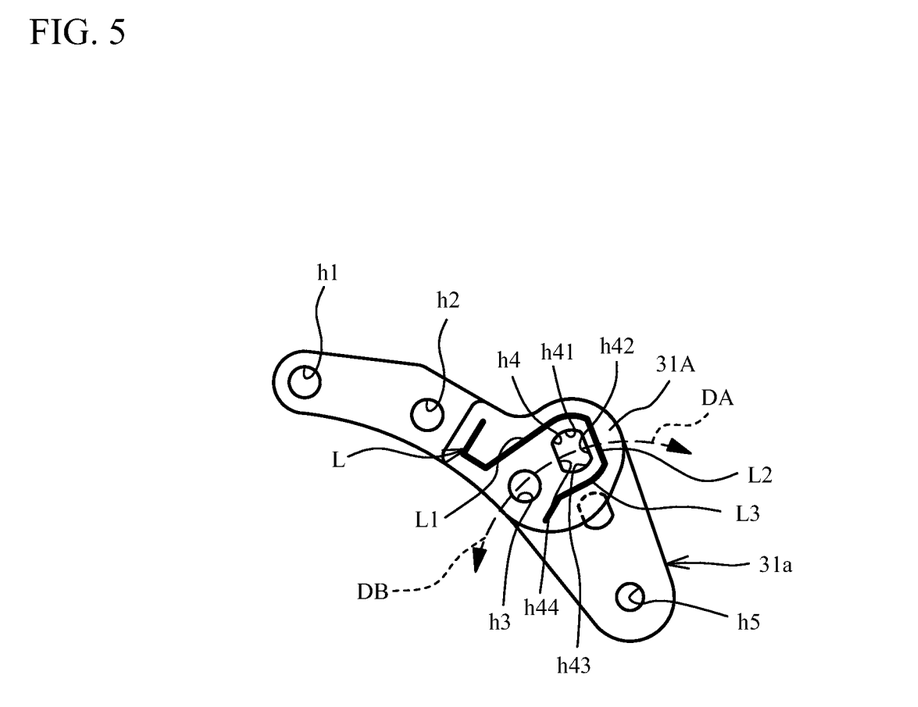
FIG. 5 is an enlarged view of the arm.

FIG. 5 is an enlarged view of the arm 31a. FIG. 5 illustrates the movable directions DA and DB of the drive pin 43a, inserting into the insertion hole h4, of the drive member 40a. Since the drive member 40a reciprocally rotates in a predetermined range, the drive pin 43a moves in the opposite directions. The reinforcement member 31A is bonded to the arm 31a by laser welding. FIG. 5 illustrates a laser welding mark L indicating a mark of the laser welding to bond the reinforcement member 31A to the arm 31a. The through hole h3 having the same size is commonly formed in the arm 31a and the reinforcement member 31A, and the insertion hole h4 having the same size is commonly formed therein. The reinforcement member 31A is bonded to the arm 31a by laser welding, so the bonding strength can be ensured, even in a case where the reinforcement member 31A is thin. For example, in a case where the reinforcement member 31A is bonded to the arm 31a by adhesive bonding, this might arise a problem such as the leakage of the excess adhesive bond into the insertion hole h4. In the present embodiment, the bonding is achieved by laser bonding, thereby solving such a problem.

The laser welding mark L includes: a region L1 extending in such a direction as to arrange two of the through hole h3 and the insertion hole h4; a region L2 curving from the region L1 to surround the periphery of the insertion hole h4; and a region L3 extending from the region L2 in such a direction as to arrange the insertion hole h4 and the through hole h3. The regions L1 and L3 are positioned to sandwich two of the through hole h3 and the insertion hole h4. The laser welding mark L entirely has a substantially S-shape, and meanders. This ensures the length of the laser welding mark L relative to the area of the reinforcement member 31A, thereby ensuring the bonding strength between the reinforcement member 31A and the arm 31a. Further, the laser welding mark L has a linearly shape, so the workability of the laser welding is facilitated.

The shape of the insertion hole h4 will be described. The through hole h3 has a circular shape, whereas the insertion hole h4 has an oblong hole shape extending radially from a support spindle hole h5. The support spindle hole h5 is inserted by the spindle 14a, and the arm 31a is rotatably supported about the spindle 14a. The insertion hole h4 includes: edge portions h41 and h43 facing each other and serving as short sides; and edge portions h42 and h44 facing each other and serving as long sides. The edge portions h41 and h43 curve. The edge portions h42 and h44 have linearly shapes. The region L2 of the laser welding mark L is evenly spaced from the edge portion h42 and parallel thereto. In addition, the shape of the drive pin 43a corresponds to that of the insertion hole h4.

For example, while the drive member 40a is rotating and the drive pin 43a is moving in the movable direction DA, the periphery of the insertion hole h4, specifically, the edge portion h42 receives the force from the drive pin 43a in the movable direction DA. In the present embodiment, the region L2 of the laser welding mark L intersects with the direction in which the periphery of the insertion hole h4 receives the force from the drive pin 43a, that is, the movable direction DA of the drive pin 43a, while the drive pin 43a is moving in the movable direction DA. Thus, the parts, of the arm 31a and the reinforcement member 31A, tending to receive the force from the drive pin 43a are bonded by laser welding. This prevents the reinforcement member 31A from being peeled off from the arm 31a, and the bonding strength therebetween.

For example, in a case where the distance is partially uneven between the region L2 and the edge portion h42 tending to receive the force, that is, the region L2 is not evenly spaced from the edge portion h42, the reinforcement member 31A might be partially peeled off from the arm 31a around the edge portion h42. In the present embodiment, the region L2 is formed to be evenly spaced from the edge portion h42 that tends to receive the force from the drive pin 43a. This prevents the reinforcement member 31A from being peeled off from the arm 31a around the edge portion h42.

Further, in the present embodiment, in order not to cause the force to focus on one point from the drive pin 43a in the movable direction DA when the drive member 40a abuts with the end of the escape slot, the edge portion h42 has a linear shape corresponding to the shape of the drive pin 43a. This prevents the reinforcement member 31A from being peeled off from the arm 31a, and also prevents the damage to the arm 31a and the reinforcement member 31A.

Furthermore, as illustrated in FIG. 5, the religions L1, L2, and L3 of the laser welding mark L surround one half or more of the periphery of the insertion hole h4. It is therefore possible to ensure the bonding strength around the insertion hole h4 to which the load tends to be applied due to the movement of the drive pin 43a.

Moreover, the reinforcement member 31A is formed with the through hole h3, and as indicated by the laser welding mark L, a part of the arm 31a around the through hole h3 is also reinforced. Further, an increase in size of the reinforcement member 31A relative to the arm 31a ensures the length of the L. Also, the through hole h3 is formed closest, among the through holes h1 to h3, to the rotation fulcrum of the arm 31a. This increases the area of the reinforcement member 31A, and ensures the bonding strength around the insertion hole h4 to which the load tends to be applied due to the movement of the drive pin 43a.

Further, as mentioned above, the connection pins Pa1 to Pa3 and Pb1 to Pb3 have the same shape and the same size. For this reason, in a case of the reinforcement member in the present embodiment is employed in another focal-plane shutter, the conventional connection pins can be used, so the bonding strength between the arm and the reinforcement member can be ensured without using a special connection pin.

Also, as illustrated in FIG. 3, the reinforcement member 31A has a thin plate shape thinner than the arm 31a. Thus, the reinforcement member 31A can be appropriately bonded to the arm 31a by laser welding.

Additionally, as illustrated in FIG. 3, the reinforcement member 31A is provided on the surface, of the arm 31a, opposite to the surface facing the blades 21a to 23a. Therefore, this makes it possible to prevent the abutment of the edge of the outer peripheral shape with the blades 21a to 23a. It is thus possible to appropriately reinforce the arm while the steady movements of the blades 21a to 23a are ensured.

Figure 6:
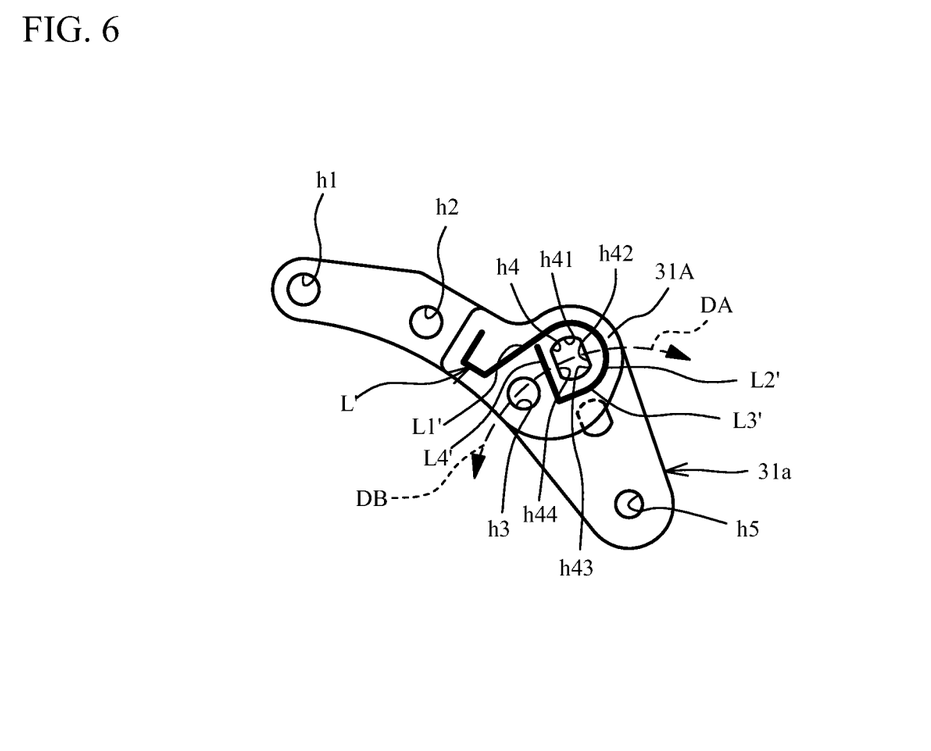
FIG. 6 is an explanatory view of a variation of a laser welding mark.

FIG. 6 is an explanatory view of a variation of a laser welding mark. A laser welding mark L' includes: a region L2' curving; a region L4' extending to sandwich the insertion hole h4 between the region L2' and the region L4'. The region L4' extends between the insertion hole h4 and the through hole h3. The region L2' intersects with the movable direction DA of the drive pin 43a, so the parts, of the arm 31a and the reinforcement member 31A, tending to receive the force from the drive pin 43a are bonded by laser welding. Further, the region L4' intersects with the movable direction DB of the drive pin 43a, so parts, of the arm 31a and the reinforcement member 31A, tending to receive the force from the drive pin 43a are bonded by laser welding. This ensures the bonding strength therebetween.

Also, the reinforcement member 31A and the arm 31a may be laser welded so as to include the region L2 parallel to the edge portion h42 illustrated in FIG. 5, and the region L4' parallel to the edge portion h44 illustrated in FIG. 6. The arm 31b and the reinforcement member 31B may be formed with the laser welding mark L illustrated in FIG. 5, or the laser welding mark L' illustrated in FIG. 6. In addition, laser welding marks may be formed in the opposite sides so as to be evenly spaced from respective linearly edge portions.

Next, a description will be given of a method for producing the arm 31a by laser welding. The arm 31a and the reinforcement member 31A separately formed beforehand are positioned by jigs. Specifically, the arm 31a and the reinforcement member 31A are overlapped such that the through hole h3 and the insertion hole h4 of the arm 31a positionally and respectively correspond to the through hole h3 and the insertion hole h4 of the reinforcement member 31A, and the through hole h3 and the insertion hole h4 are inserted by respective rod-shaped jigs. Two holes having the same shape and the same size are inserted by the rod-shaped jigs, so the arm 31a and the reinforcement member 31A are positioned relative to each other. In this way, two of the arm 31a and the reinforcement member 31A are positioned by use of the through hole h3 and the insertion hole h4, whereby the positioning is facilitated. Next, the arm 31a and the reinforcement member 31A are laser welded by a laser welding device.

The arm 31a is produced in this way. After laser welding, the arm 31a is connected to the blade 21a to 23a by the common connection pins Pa1 to Pa3 and is assembled to the board 10, and the drive pin 43a of the drive member 40a is inserted into the insertion hole h4. After that, the board 10 is assembled with the output member 50a and the rotor 72a, so the focal-plane shutter 1 is produced.

While the exemplary embodiments of the present invention have been illustrated in detail, the present invention is not limited to the above-mentioned embodiments, and other embodiments, variations and modifications may be made without departing from the scope of the present invention.

In the present embodiment, the leading blade 20A and the trailing blade 20B are driven by use of the actuators. However, the present invention is not limited to this. For example, the operation of an electromagnet and a spring may drive the blade through the drive member.

Further, the present embodiment has described the focal-plane shutter 1, but the present invention is not limited to this configuration. For example, it may be a blade-driving device for opening and closing an opening of a board by a single blade.

Finally, several aspects of the present invention are summarized as follows.

According to an aspect of the present invention, there is provided a blade-driving device includes: a board including an opening; a blade opening and closing the opening; an arm driving the blade and made of a synthetic resin; a drive member driving the arm; and a reinforcement member formed with a laser welding mark indicating a mark formed by laser welding the reinforcement member and the arm together, and made of a synthetic resin. The bonding of the synthetic resin-made reinforcement member to the synthetic resin-made arm by laser welding can ensure the bonding strength therebetween.

According to another aspect of the present invention, there is provided an optical device including the above blade-driving device.

According to another aspect of the present invention, there is provided a method for producing an arm for driving a blade opening and closing an opening of a board, including: commonly inserting a jig into insertion holes respectively formed in an arm and a reinforcement member; inserting a jig into through holes respectively formed in the arm and the reinforcement member and different from the insertion holes; and laser welding the arm and the reinforcement member.

What is claimed is:

1. A blade-driving device comprising: a board including an opening;
   a blade opening and closing the opening;
   an arm driving the blade and made of a synthetic resin;
   a drive member driving the arm;
   a connection pin connecting the arm and the blade, wherein the arm and the reinforcement member include through holes through which the connection pin commonly penetrates;
   a laser welding mark formed in such a direction as to arrange an insertion hole and the through hole, wherein the arm and the reinforcement member include insertion holes into which a drive pin is commonly inserted; and
   a reinforcement member formed with the laser welding mark indicating a mark formed by laser welding
   the reinforcement member and the arm together, and made of a synthetic resin,
   wherein the reinforcement member has a thin plate shape.

2. The blade-driving device of claim 1, wherein the drive member includes a drive pin movable
   within a predetermined range,
   the arm and the reinforcement member include insertion holes into which the drive pin is commonly inserted,
   the laser welding mark includes a region intersecting with a movable direction of the drive pin.

3. The blade-driving device of claim 2, wherein the region is formed to be evenly spaced from an edge portion of the insertion hole.

4. The blade-driving device of claim 3, wherein the edge portion has a linear shape,
   the region is parallel to the edge portion.

5. The blade-driving device of claim 2, wherein the laser welding mark is formed along one half or more of a periphery of the insertion hole.

6. The blade-driving device of claim 1, wherein the arm is rotatably supported about a
   predetermined fulcrum,
   the blade includes plural blades,
   the connection pin includes plural connection pins connecting the respective plural blades and the arm, the through holes of the arm and the reinforcement member are penetrated by the connection pin closest, among the plural connection pins, to the fulcrum of rotation of the arm.

7. The blade-driving device of claim 6, wherein the plural connection pins have the same shape.

8. The blade-driving device of claim 1, wherein the reinforcement member is thinner than the arm.

9. The blade-driving device of claim 1, wherein the reinforcement member is provided on a surface, of the arm, opposite to a surface facing the blade.

10. An optical device comprising: a board including an opening;
- a blade opening and closing the opening;
- an arm driving the blade and made of a synthetic resin;
- a drive member driving the arm;
- a connection pin connecting the arm and the blade, wherein the arm and the reinforcement member include through holes through which the connection pin commonly penetrates;
- a laser welding mark formed in such a direction as to arrange an insertion hole and the through hole, wherein the arm and the reinforcement member include insertion holes into which a drive pin is commonly inserted; and
- a reinforcement member formed with the laser welding mark indicating a mark formed by laser welding the reinforcement member and the arm together, and made of a synthetic resin,
wherein the reinforcement member has a thin plate shape.

11. A method for producing an arm for driving a blade opening and closing an opening of a board, comprising:
- commonly inserting a jig into insertion holes respectively formed in an arm and a reinforcement member;
- inserting a jig into through holes respectively formed in the arm and the reinforcement member and different from the insertion holes;
- laser welding the arm and the reinforcement member having a thin plate shape such that a laser welding mark is formed in such a direction as to arrange the insertion hole and the through hole;
- commonly inserting a connection pin connecting the arm and the blade through the through holes; and
- commonly inserting a drive pin of a drive member into the insertion holes.

* * * * *

UNITED STATES PATENT AND TRADEMARK OFFICE
CERTIFICATE OF CORRECTION

PATENT NO. : 9,383,625 B2
APPLICATION NO. : 14/700662
DATED : July 5, 2016
INVENTOR(S) : Hiroshi Takahashi et al.

Page 1 of 1

It is certified that error appears in the above-identified patent and that said Letters Patent is hereby corrected as shown below:

On the Title Page, item (63) "PCT/EP2013/078870" should read --PCT/JP2013/078870--

Signed and Sealed this
Twenty-third Day of August, 2016

Michelle K. Lee
*Director of the United States Patent and Trademark Office*